R. L. MORGAN.
MEANS FOR LOADING AND UNLOADING MOTOR TRUCKS.
APPLICATION FILED FEB. 16, 1911.
1,030,320.
Patented June 25, 1912.
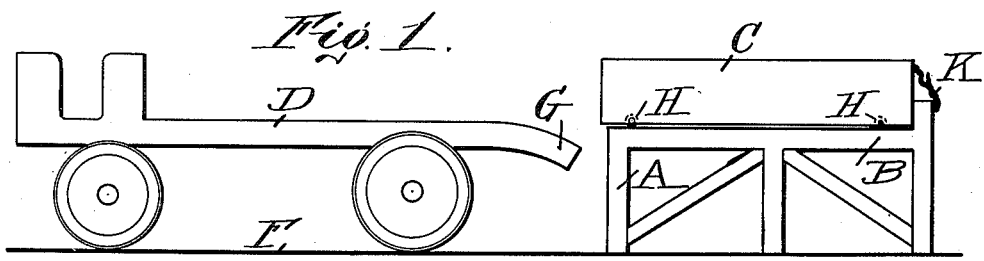
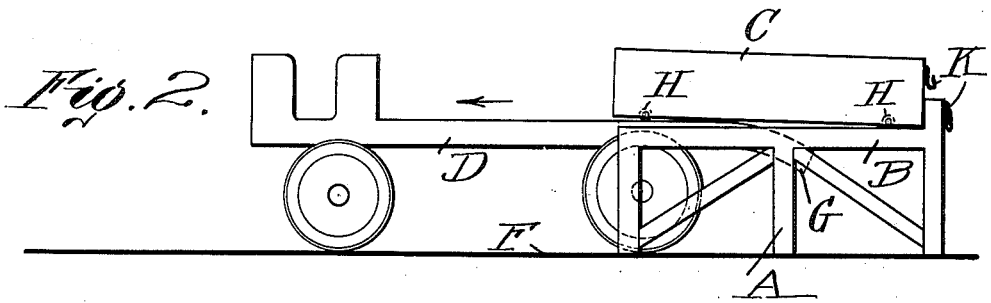
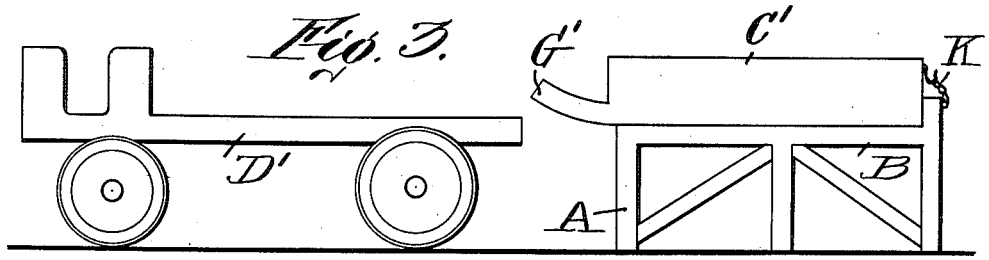
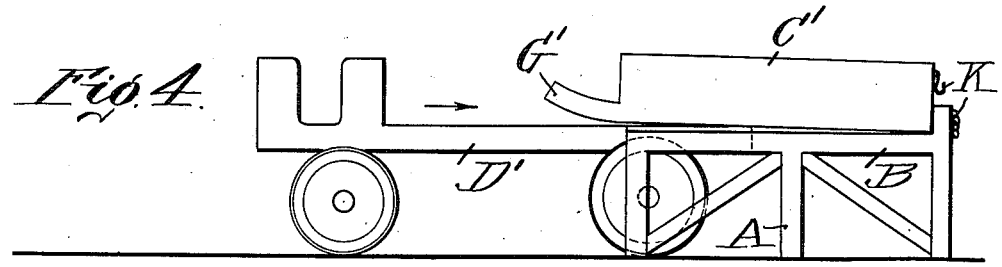

UNITED STATES PATENT OFFICE.

RALPH L. MORGAN, OF WORCESTER, MASSACHUSETTS.

MEANS FOR LOADING AND UNLOADING MOTOR-TRUCKS.

1,030,320. Specification of Letters Patent. Patented June 25, 1912.

Application filed February 16, 1911. Serial No. 609,036.

*To all whom it may concern:*

Be it known that I, RALPH L. MORGAN, a citizen of the United States, residing at Worcester, in the county of Worcester and State of Massachusetts, have invented a new and useful Means for Loading and Unloading Motor-Trucks, of which the following is a specification.

This invention relates to the loading and unloading of motor trucks, and the like.

The principal objects of the invention are to provide a certain relationship between a truck, crate, and slip into which the truck moves to be loaded and unloaded whereby when the truck moves into the slip to receive a crate it gradually raises the crate off the slip so that by the time the truck is completely in the slip it bears the weight of the crate or removable body, and can be moved out of the slip taking the crate with it without necessitating the fastening of the crate to the truck. In this way it will be seen that no attendant is required in the loading of a crate on the truck.

Another object of the invention is to provide a construction in which in unloading a crate from the truck, the truck backs into the slip with the crate thereon, and means is provided whereby if the crate is fastened at the rear end and the truck is moved out the crate will be supported as it descends from the truck.

Reference is to be had to the accompanying drawings, in which—

Figure 1 is a side elevation of a slip and truck constructed in accordance with this invention; Fig. 2 is a similar view of the same showing the truck partly backed into the slip to receive a crate therefrom; Fig. 3 is a view similar to Fig. 1 showing another form of the invention; and Fig. 4 is a view thereof similar to Fig. 2.

The form of this invention illustrated in Figs. 1 and 2 involves a platform A having a pair of supports B for a crate or removable body C forming between them a slip or stall wide enough to receive the motor truck D. In this case the supports B are horizontal and so is the surface F on which the wheels of the truck run. These two surfaces being parallel there is no inclination for the crate to be drawn up when removed back from the supports B, and none for the truck to ascend while it is being loaded in the manner hereinafter described. The supports B are located lower than the body of the truck on which the crate rests, and the truck is provided at its rear end with a downwardly deflected portion G in effect constituting a cam surface. This portion extends down to a point below the surface of the supports B on which the crate is adapted to rest. When the truck backs into the slip on which the crate rests, the crate is gradually raised at the front on the cam surface G until the front end rests on the horizontal portion of the truck platform, as indicated in Fig. 2. As the truck continues to back in, the front of the crate engages the cam surface G and is gradually raised to the level of the rear until it rests on the truck. In this way it will be seen that as the truck backs in the entire weight of the crate is gradually raised from the supports B and left on the truck without the employment of any movable mechanism or the use of any power operated devices whatever, except that used for moving the truck. When the truck has reached the end of the slip the crate will be resting entirely on the truck, and the truck can move out with the crate without manipulating the crate or handling it in any way, or even fastening it to the truck. Therefore no attendant is required in loading a crate, except the operator of the truck, and he does not have to leave his seat.

The crate if desired may be provided with rollers H adapted to rest on the body of the truck and on the supports. In that case these rollers will be the parts which come into contact with the cam surface G, and the friction will be greatly reduced. Now considering the opposite state of affairs, when a crate is located on the truck and the truck is backed in to be unloaded, it will be seen that it can back clear in the slip which does not disturb the position of the crate in any way. Then the rear end of the crate is fastened to the platform by fastening devices K or the like. When the truck moves out the crate will be gradually deposited on the slip by the rollers sliding down the cam surface G.

In the form shown in Figs. 3 and 4 similar conditions exist. The parts A, B, F, and K are the same as in Figs. 1 and 2, and have the same relations to each other. The truck D' however is of ordinary construction while the crate C' has its front end G' deflected upwardly to form a cam surface. In this case the results of backing an empty truck into a loaded slip and of backing a loaded truck into an empty slip are the same as in the form shown in Figs. 1 and 2, and the advantages are substantially the same.

While I have illustrated and described two preferred embodiments of the invention, I am aware that many other changes can be made therein by any person skilled in the art without departing from the scope of the invention as expressed in the claims. Therefore I do not wish to be limited to all the details of construction herein shown and described but What I do claim is:—

1. In an apparatus of the class described, the combination with a motor truck, and a removable crate or body therefor, of a slip for supporting the crate or body into which slip the truck may be run, the platform of said truck being slightly higher than the slip the crate will be supported on the with a crate thereon runs into the slip the crate will be supported on the truck over the slip so that if the crate is fastened at its rear end and the truck run out the crate will be deposited on the slip.

2. In an apparatus of the class described, the combination with a motor truck having a relatively fixed platform, and a removable crate or body therefor, of a slip for supporting the crate or body into which slip the truck may be run, and means whereby when the truck with a crate thereon runs into the slip the crate will be supported on the platform over the slip so that if the crate is fastened at its rear end and the truck run out, the end of the crate will gradually descend and the crate will be deposited on the slip.

3. In an apparatus of the class described, the combination with a motor truck, and a removable crate or body therefor, of a slip for supporting the crate or body into which slip the truck may be run, and means whereby when the truck is run into the slip on which a crate is located, the longitudinal motion of the truck will gradually raise the crate off the slip, so that it will rest wholly on the truck, whereby when the truck moves out it will carry the crate with it.

4. In an apparatus of the class described, the combination with a motor truck having a relatively fixed platform, and a removable crate or body therefor, of a slip for supporting the crate or body into which slip the truck may be run, and means whereby when the truck is run into the slip on which a crate is located, the longitudinal motion of the platform truck will gradually raise the end of the crate off the slip.

5. In an apparatus of the class described, the combination with a motor truck having a relatively fixed platform, and a removable crate or body therefor, of a slip for supporting the crate or body into which slip the truck may be run, and means on the crate whereby when the truck with a crate thereon runs into the slip the longitudinal motion of the truck will cause the crate to be supported on the platform over the slip so that if the crate is fastened at its rear end and the truck runs out, the crate will be deposited on the slip.

6. In an apparatus of the class described, the combination with a motor truck, and a removable crate or body therefor, of a slip for supporting the crate or body into which slip the truck may be run, the platform of said truck being slightly higher than the top of said slip whereby when the truck with a crate thereon runs into the slip one end of the crate will be supported on the truck over the slip so that if the crate is fastened at its rear end and the truck runs out, one end of the crate will be lowered on the slip gradually.

7. In an apparatus of the class described, the combination with a motor truck, and a removable crate or body therefor, of a slip for supporting the crate or body into which slip the truck may be run, and means on the crate for supporting the crate on the truck and slip, said means being deflected upwardly at its end.

8. In an apparatus of the class described, the combination with a motor truck and a removable crate or body therefor, of a slip for supporting the crate or body into which slip the truck may be run, said slip having a stop at the rear end for limiting the motion of the crate thereon in one direction, and means whereby when the truck is run into the slip on which the crate is located, the truck will gradually raise the crate off the slip so that it will rest on the truck, whereby when the truck moves out, it will carry the crate with it.

In testimony whereof I have hereunto set my hand, in the presence of two subscribing witnesses.

RALPH L. MORGAN.

Witnesses:
ALBERT E. FAY,
C. FORREST WESSON.